US00RE37378B1

(19) United States
(12) Reissued Patent
Nagano

(10) Patent Number: US RE37,378 E
(45) Date of Reissued Patent: Sep. 18, 2001

(54) READER WITH HIGH-RESOLUTION MODE AND HIGH-SPEED MODE

(75) Inventor: Fumikazu Nagano, Yamato-Koriyama (JP)

(73) Assignee: Sharp Kabushiki Kaisha, Osaka (JP)

(21) Appl. No.: 09/136,597

(22) Filed: Aug. 19, 1998

Related U.S. Patent Documents

Reissue of:
(64) Patent No.: 5,687,003
Issued: Nov. 11, 1997
Appl. No.: 08/543,192
Filed: Oct. 13, 1995

(30) Foreign Application Priority Data

Nov. 25, 1994 (JP) ..... 6-291660

(51) Int. Cl.[7] ..... H04N 1/40; H04N 1/047; H04N 1/028

(52) U.S. Cl. ..... 358/445; 358/474; 358/483

(58) Field of Search ..... 358/445, 471, 358/474, 482, 483, 494; 341/156, 155; 250/208.1

(56) References Cited

U.S. PATENT DOCUMENTS 4,733,217 * 3/1988 Dingwall ..... 341/156
5,053,771 * 10/1991 McDermott ..... 341/156
5,264,945 * 11/1993 Kannegundla et al. ..... 358/482

FOREIGN PATENT DOCUMENTS 0613 289A1 * 2/1994 (EP) ..... H04N/1/028
5-48460 * 2/1993 (JP) ..... H03M/1/12
6-253091 * 9/1994 (JP) ..... H04N/1/40

OTHER PUBLICATIONS

I. Tokuji, et al., "Automatic Focus Detector", *Patent Abstracts of Japan*, vol. 11, No. 391, (1987) p. 649.*

* cited by examiner

*Primary Examiner*—Scott Rogers
(74) *Attorney, Agent, or Firm*—Dike, Bronstein, Roberts & Cushman, LLP; David G. Conlin

(57) ABSTRACT

A reader having a high-resolution mode and a high-speed mode is disclosed. The reader comprises a CCD sensor, a buffer, a first AD convertor, a second AD convertor, a data selector and a control circuit. The input of the buffer is connected to the CCD sensor through a capacitor and a 5 V power source through an analog switch, and an output of the buffer is connected to the first AD converter for the high-resolution mode and the second AD converter for the high-speed mode in parallel. The data selector for selecting an output from the first AD convertor or the second AD convertor and sending it out to the control circuit is connected to the outputs of the first AD convertor and the second AD convertor.

7 Claims, 9 Drawing Sheets

READER WITH HIGH-RESOLUTION MODE AND HIGH-SPEED MODE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a reader and more particularly, to a reader having a high-resolution mode and a high-speed mode using a CCD sensor.

2. Description of the Related Art

Recently, as means for inputting a document and drawing data or input means for digital copiers and facsimile, there has been widely used a reader using a CCD sensor.

A CCD sensor used in this reader will be described by referring to FIG. 5.

Analog shift registers arranged in odd rows and analog shift register arranged in even rows are finally combined into an output signal $CCD_{OUT}$ through buffers. Symbols $S_1$, $S_2$, . . . $S_N$ denote light receiving means. $OSR_1$, $OSR_2$, . . . $OSR_{N/2}$ denote odd-row shift registers for shifting out the analog outputs of light receiving means on the odd side (light receiving means arranged in odd rows) an $ESR_1$, $ESR_2$, . . . $ESR_{N/2}$ denote even-row shift registers for shifting out the analog outputs of light receiving means on the even side (light receiving means arranged in even rows). Furthermore, symbol SH denote a start pulse for the shift operation of the shift registers, symbols $\phi_1$ and $\phi_2$ denote transfer pulses, and symbol $\phi_R$ denotes a reset pulse.

Then, referring to FIG. 3, the positional relationship between a line-shaped fluorescent lamp 33 and a CCD sensor 37 in a reader will be described.

A manuscript 31 is laid on a glass table 32. In FIG. 3, the glass table 32 and the manuscript 31 are spaced from each other but actually are closely in contact with each other. The manuscript 31 is illuminated through the glass table 32 with a ray of light emitted from the fluorescent lamp 33 with the longitudinal direction placed vertically to the surface of a paper. The ray of light reflected from the manuscript passes again through the glass table and is reflected from the mirror 35. The ray of light reflected from the mirror 35 is focussed at a lens 36 and illuminated to the light receiving surface of the CCD sensor 37. Numeral 34 denotes an optical unit including the mirror 35, the lens 36 and the CCD sensor 37, while numerals 38 and 39 denote a pulse motor and a cabinet, respectively.

As shown in FIG. 4, a conventional reader incorporates a CCD sensor 40 for converting a received light into an electrical signal and the CCD sensor 40 is connected via a capacitor C to an input of a buffer 41. The input of the buffer 41 is connected to a 5 V electric power source via an analog switch. The output of the buffer 41 is connected to the input of an AD converter 42. The outputs $D_0$–$D_7$ of the AD converter 42 are connected to a control circuit 43. The output FLON of the control circuit 43 is connected to the input of a lighting device 48. The output of the lighting device 48 is connected to the input of a fluorescent lamp 33. When the FLON turns to "1", the fluorescent lamp 33 turns on. The outputs $T_{STEP}$ and FORWARD of the control circuit 43 are connected to the input of a pulse motor drive circuit 46. The input of the pulse motor drive circuit 46 is connected to the input of a pulse motor 38. If "FORWARD" is "1" the pulse motor 38 is rotated by the pulse motor drive circuit 46 so as to forward the optical unit 34 and the fluorescent lamp 33 by one step, when the pulse motor receives one time of $T_{STEP}$ pulse. Similarly, if "FORWARD" IS "0", the pulse motor 38 is rotated so as to reverse the optical unit 34 and the fluorescent lamp 33, when the pulse motor receives the $T_{STEP}$ pulse.

The control circuit 43 comprises an oscillator 44 and a clock generating circuit 45 connected thereto. A basic clock $t_0$ is oscillated by the oscillator 44 and divided in frequency by the clock generating circuit 45 to generate various control pulses SH, $\phi_1$, $\phi_2$, $\phi_R$ and $T_{CLAMP}$. Control pulses SH, $\phi_1$, $\phi_2$ and $\phi_R$ are supplied to the CCD sensor 40 and a control pulse $T_{CLAMP}$ is supplied to the analog switch.

FIG. 2 shows drive signals SH, $\phi_1$, $\phi_2$, $\phi_R$ to the CCD sensor 40, a CCD output $CCD_{out}$ a clamp signal $T_{CLAMP}$ for clamping the $CCD_{out}$ a timing of ADIN which is an input signal to the AD converter 42.

Then, the operation of an analog switch and C shown in FIG. 4 will be described.

Ordinarily, the CCD output $CCD_{out}$ is not defined as a DC signal, for example, outputted in the negative direction from a standard voltage of 4 V, as shown in FIG. 2. This standard varies between 3.5 V and 4.5 V according to each CCD sensors. However, since the AD convertor will digitalize an analog voltage of 5 V or less, it is necessary to shift the DC level in such a manner that a value of output voltage from the capacitor C and the analog switch may be 5 V or less. Thus, the capacitor C comes to be always charged to 1 V.

Here, the $CCD_{out}$ has a load of long transmission path and is usually amplified in use, and accordingly noises in the relevant amplifier are randomly superimposed onto the $CCD_{out}$. For example, the DC level of the $CCD_{out}$ is normally 4 V but is assumed to become 3.8 V due to the random noises mentioned above. At this time, C has to be rapidly charged to 1.2 V that is 0.2 V higher than a normal 1 V. Thus, setting the clamp time to t=300 nsec and the ON resistance of the analog switch to 50 Ω, The capacitance C becomes as follows:

$C\Omega R \ll t$ $C \leqq 300\ \text{nsec}/50\ \Omega = 6000\ \text{pF}$.

In conventional scanners, a value of 1000 pF or less is selected. By secure clamping of the DC level of each individual CCD signal outputs in this way, an image with reduced random noise is obtained as a reader.

On the other hand, Japanese Patent Application Laying Open No. 5-48460 discloses a three-dimensional integrated circuit comprising an AD converter for executing a digital to analog conversion with high-speed and high-resolution.

However, in a reader described by referring to FIGS. 2 to 5, through an image with reduced random noise is obtained as a reader, by secure clamping of the DC level of each individual CCD signal outputs, the stable period of the $CCD_{out}$ is further needed before and after the clamp signal $T_{CLAMP}$, thereby the operating speed becomes slower. In addition, a three-dimensional integrated circuit disclosed in Japanese Patent Application Laying Open No. 5-48460 comprises a complicated circuit and becomes slower in the rate of AD conversion than ordinary AD converter.

In order to solve these problems, as shown in Japanese Patent application Laying Open No. 6-253091, the applicant of the present invention proposes a reader comprising: a CCD sensor for individually outputting an output of the light receiving section arranged in odd rows and an output of that arranged in even rows; a first AD converter corresponding to either one of the outputs of odd rows or even rows; a second AD convertor corresponding to the other of the outputs of odd rows or even rows; and means for supplying the other of the outputs of odd rows or even rows to the first AD convertor when a high-resolution mode is selected.

However, in the reader of Japanese Patent Application Laying Open No. 6-253091, the quality in the high-resolution mode is equal to the quality of ordinary reader though the device becomes complicated.

SUMMARY OF THE INVENTION

It is therefore an object of the present invention to provide a reader capable of selecting either the high-resolution mode or the high-speed mode and further enabling the read to be performed at higher speed in the high-speed mode and/or at higher quality in the high-resolution mode.

According to the present invention, the above object is achieved by a reader having a high-resolution mode and a high-speed mode comprising: a CCD sensor for converting a received light into an electrical signal; a first AD convertor for converting the output signal of said CCD sensor into a digital signal; a second AD converter for converting the output signal of said CCD sensor into a digital signal with fewer bits than those of said first AD convertor; and means for selecting one of output signals of said first and said second AD convertors.

Preferably, the first AD convertor performs an analog to digital conversion for a longer period than that of said second AD convertor.

More preferably, the first and second AD convertors are arranged to convert the output of the CCD sensor within a predetermined course of time during the respective reading period, and the ratio of said predetermined course of time to the reading period in said second AD convertor is shorter than that of said predetermined course of time to the reading period in said first AD convertor to secure a period for stabilzing the output signal level of the CCD sensor.

In the reader according to the present invention, a ray of light reflected from a manuscript is received by the CCD sensor for converting the light into an electric signal, and an output of the CCD sensor is converted into a digital signal with a high-quality and accuracy by the first AD convertor when a high-resolution mode is selected. On the other hand, when a high-speed read is selected, a ray of light reflected from a manuscript is received by the CCD sensor for converting the light into an electric signal, and an output of the CCD sensor is converted into a digital signal by the second AD convertor in fewer bits than those of said first AD convertor, thereby enabling the read to be performed at higher speed in the high-speed mode and at higher quality in the high-resolution mode.

Accordingly, it is possible to obtain desired resolution corresponding to various images in a single scanner by switching the AD convertors by the output selection means.

Preferably, an output of the CCD sensor is converted into a digital signal by the first AD convertor for a longer period than that of said second AD convertor, thereby enabling the read to be performed at higher quality in the high-resolution mode.

More preferably, the ratio of the course of time taken till an output signal has been converted to the reading period of the CCD sensor in said second AD convertor is shorter than that of the course of time taken till an output signal has been converted to the reading period of the CCD sensor in said first AD convertor, thereby securing a period for stabilizing the DC level in output signals Of the CCD sensor so that output signals of the CCD sensor can sufficiently be stabilized even at the high-speed mode. Accordingly, it is possible to perform a high-speed image reading process in the high-speed mode and obtaining a stable back level for enabling a stable output image to be obtained.

Further objects and advantages of the present invention will be apparent from the following description of the preferred embodiment of the invention as illustrated in the accompanying drawings.

DESCRIPTION OF THE PREFERRED EMBODIMENT

Figure 1:
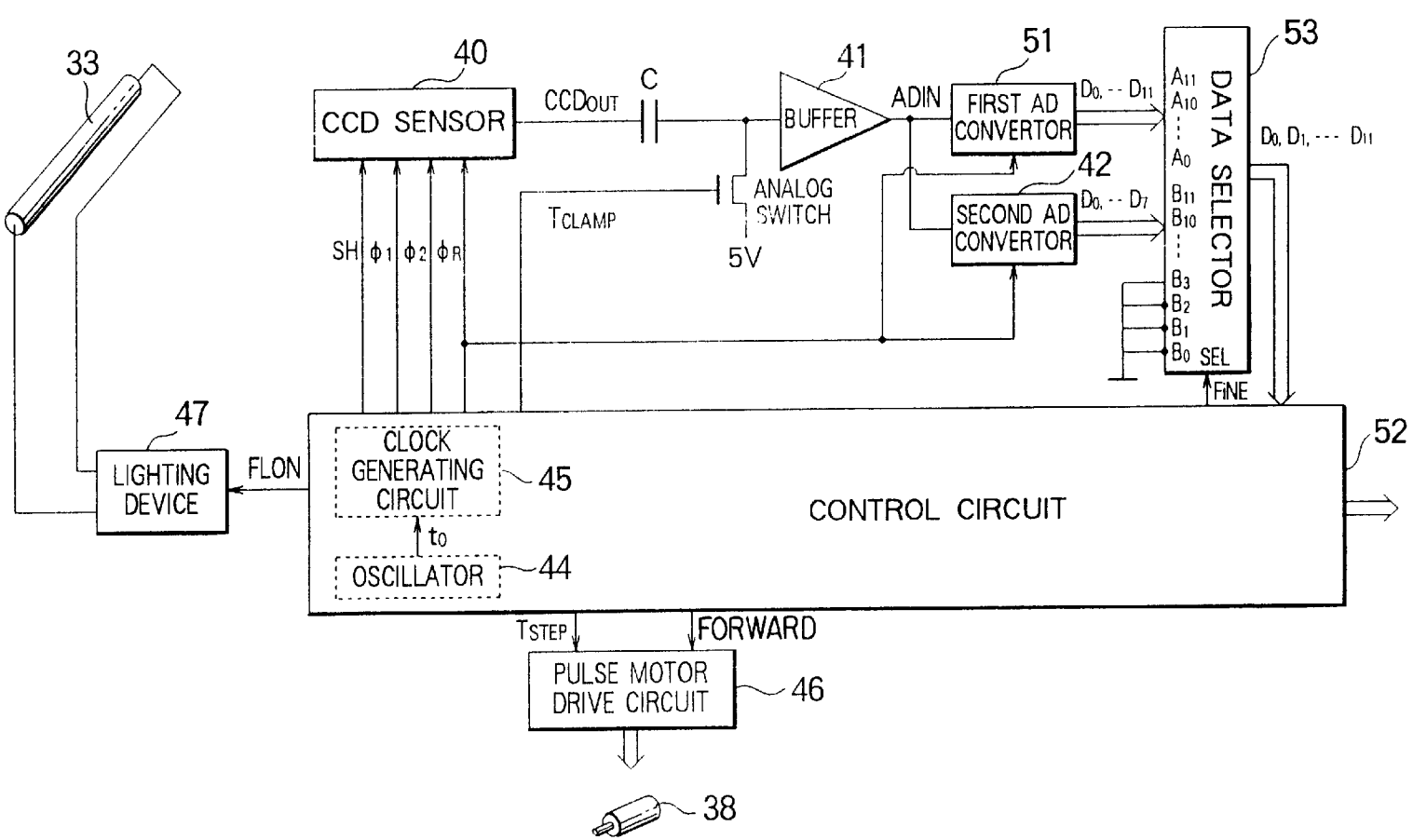
FIG. 1 is a block diagram showing the constitution of a reader according to one embodiment of the present invention.
Figure 2:
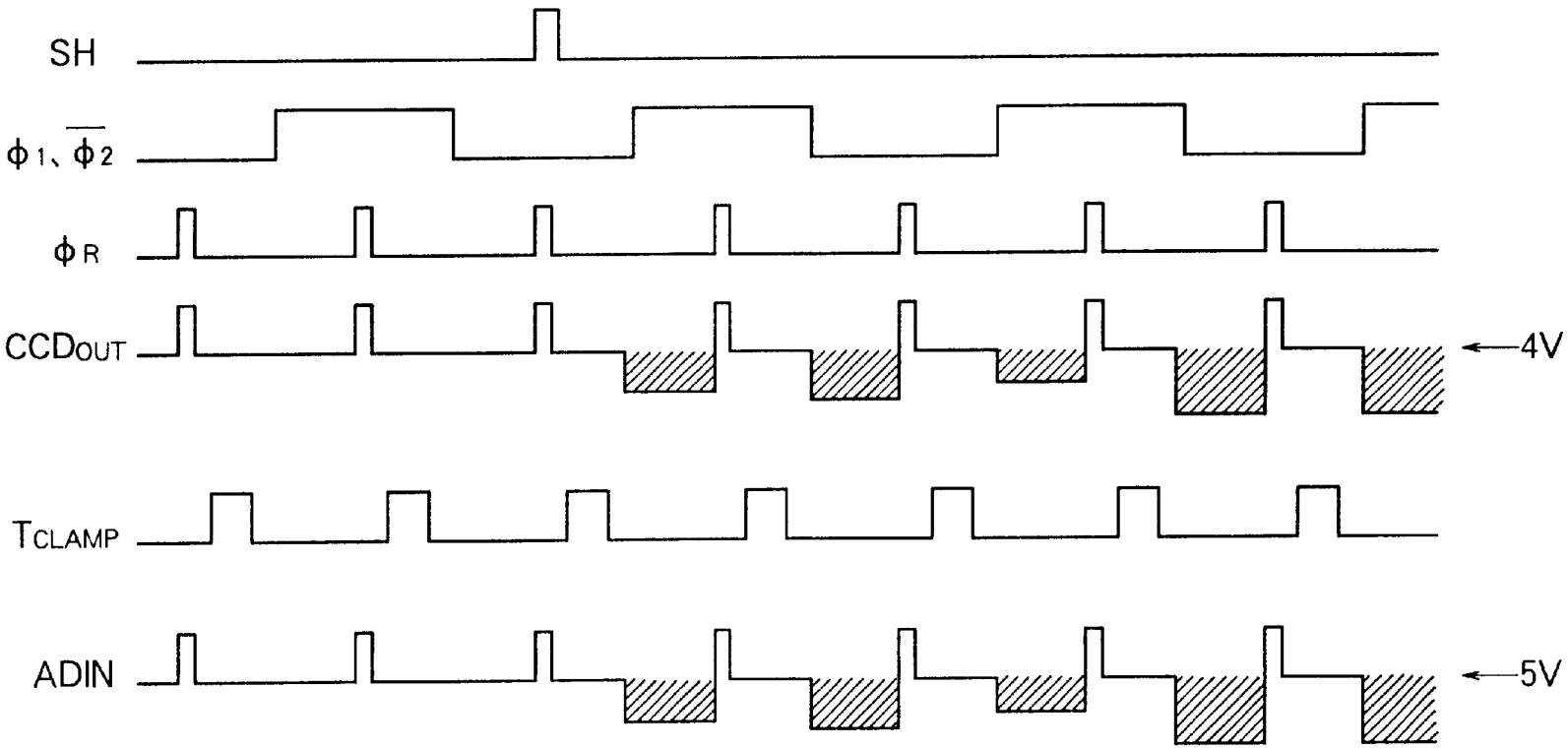
FIG. 2 (PRIOR ART)
FIG. 2 is the timing chart of a conventional reader.
Figure 3:
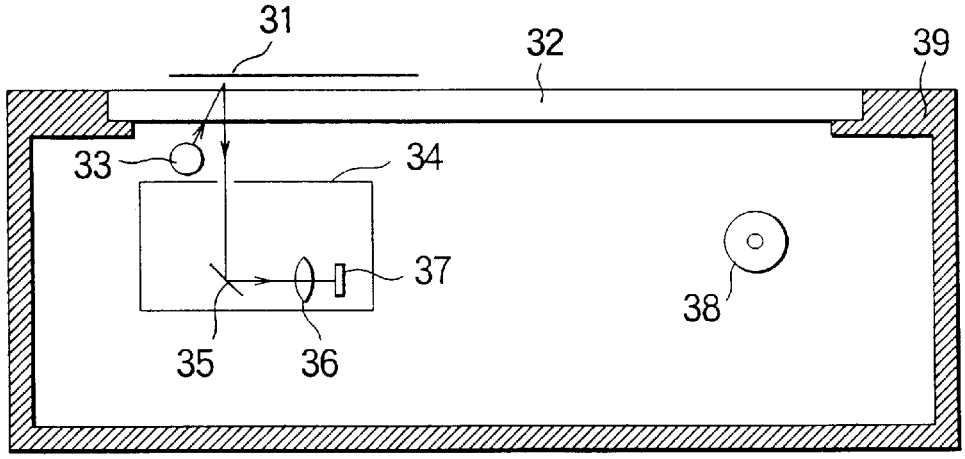
FIG. 3 (PRIOR ART)
FIG. 3 is a schematic drawing of a reader.
Figure 4:
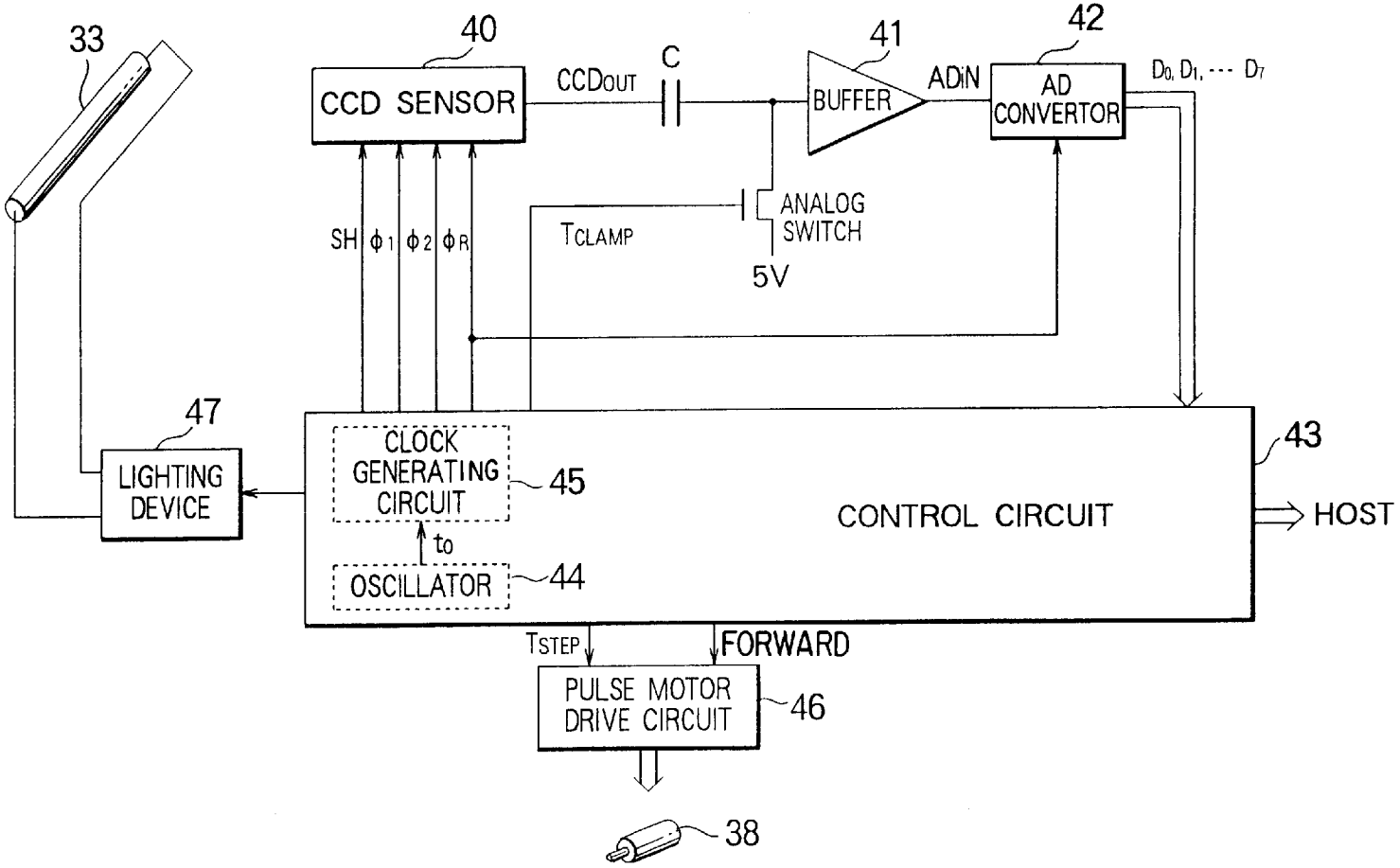
FIG. 4 (PRIOR ART)
FIG. 4 is a block diagram showing the constitution of a conventional reader.
Figure 5:
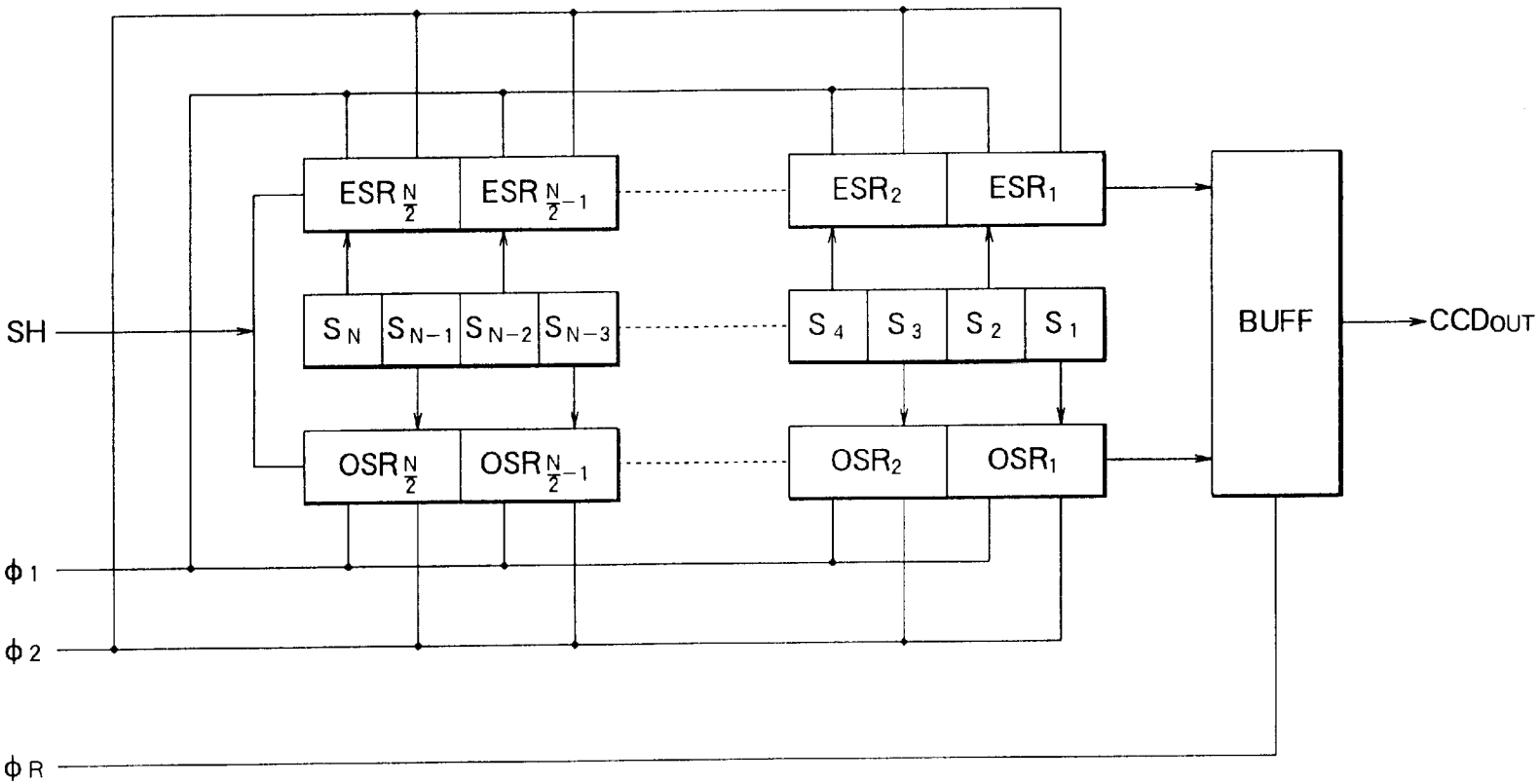
FIG. 5 (PRIOR ART)
FIG. 5 is a block diagram of a CCD used in a conventional reader.

Next, the embodiment of the present invention will be described by referring to the drawings.

As shown in FIG. 1, a reader according to the present invention comprises a fluorescent lamp 33 for illuminating light onto a manuscript, a control circuit 52 for controlling each section and a CCD sensor 40 for receiving a ray of light reflected from the manuscript and converting it into an electrical signal. The fluorescent lamp 33 is connected to the control circuit 52 through a lighting device 47 for controlling a lighting. The output FLON of the control circuit 52 is connected to the input of the lighting device 47. The output of the lighting device 47 is connected to the input of the fluorescent lamp 33. When the FLON turns to "1", the fluorescent lamp 33 is put on. On the other hand, the CCD sensor 40 is connected to the input of a buffer 41 through the capacitor C, and a 5 V electric power source is connected to the input of the buffer 41 through the analog switch. Because the black level of CCD signals is ordinarily approx. 4 V (varies between 3 V and 5 V with different CCDs), an output voltage value ADIN of the buffer 41 is adjusted accurately to 5 V under action of a clamp signal $T_{CLAMP}$. To the output of the buffer 41, a 12-bit first AD convertor 51 for the high-resolution mode and an 8-bit second AD convertor 42 for the high-speed mode are connected in parallel, while a reset pulse $\phi_R$ is inputted to the first AD convertor 51 and the second AD convertor 42. Also, to the output of the first AD convertor 51 and that of the second AD convertor 42, a data selector 53 for selecting an output from the first AD convertor 51 or the second AD convertor 42 and for sending it out to the control circuit 52 is connected.

Furthermore, to the control circuits 52, a pulse motor drive circuit 46 for driving and controlling a pulse motor 38 is connected, and outputs $T_{STEP}$ and FORWARD of the control circuit 52 are inputted to the pulse motor drive circuit 46. On receiving one time of $T_{STEP}$ pulse when FORWARD is "1", the pulse motor is rotated by the pulse motor drive circuit 46 in such a way that the optical unit 34 and the fluorescent lamp 33 advance by one step. Similarly, on receiving one time of $T_{STEP}$ pulse when Forward is "0", the pulse motor is rotated in such a way that the optical unit 34 and the fluorescent lamp 33 reverse.

The control circuit 52 comprises an oscillator 44 and a clock generating circuit 45 connecting therewith. A basic clock $t_0$ to oscillated by the oscillator 44 and divided in frequency by the clock generating circuit 45, so that various control pulses SH, $\phi_1$, $\phi_2$, $\phi_R$ and $T_{CLAMP}$ are generated. Control pulses SH, $\phi_1$, $\phi_2$ and $\phi_R$ are supplied to the CCD sensor 40, and the control pulse $T_{CLAMP}$ is supplied to the analog switch.

Incidentally, the first AD convertor 51 and second AD convertor 42 convert the portion of 5 V or less in their input ADIN with 12 bits or 8 bits. That is, in the case of 8-bit AD conversion.

$D_0$, $D_1$ . . . $D_7$ are equal to
0, 0, . . . 0 for ADIN=5 V,
1, 1, . . . 1 for ADIN=3 V, respectively;
and in the case of 12-bit AD conversion,
$D_0$, $D_1$, . . . $D_{11}$ are equal to
0, 0, . . . 0 for ADIN=5 V,
1, 1, . . . 1 for ADIN=1 V, respectively.

Also, the first AD convertor 51 and the second AD convertor 42 use the rising of $\phi_R$ as an AD clock. That is, the instantaneous level of the rising of $\phi_R$ in ADIN is AD-converted.

A 12-bit input A or input B is selected by the data selector 53. For example, an input A is selected when a FINE signal sent from the control circuit 52 to the SEL terminal is "1" and an input B is selected when a Fine signal is "0". However, the lower 4 bits of an input B are forcibly grounded, the 8-bit output of the second AD convertor 42 is converted into the 12-bit signal, and the output of the second AD convertor 42 is connected to the upper 8 bits of the 12-bit input of the data selector 53.

Figure 6:
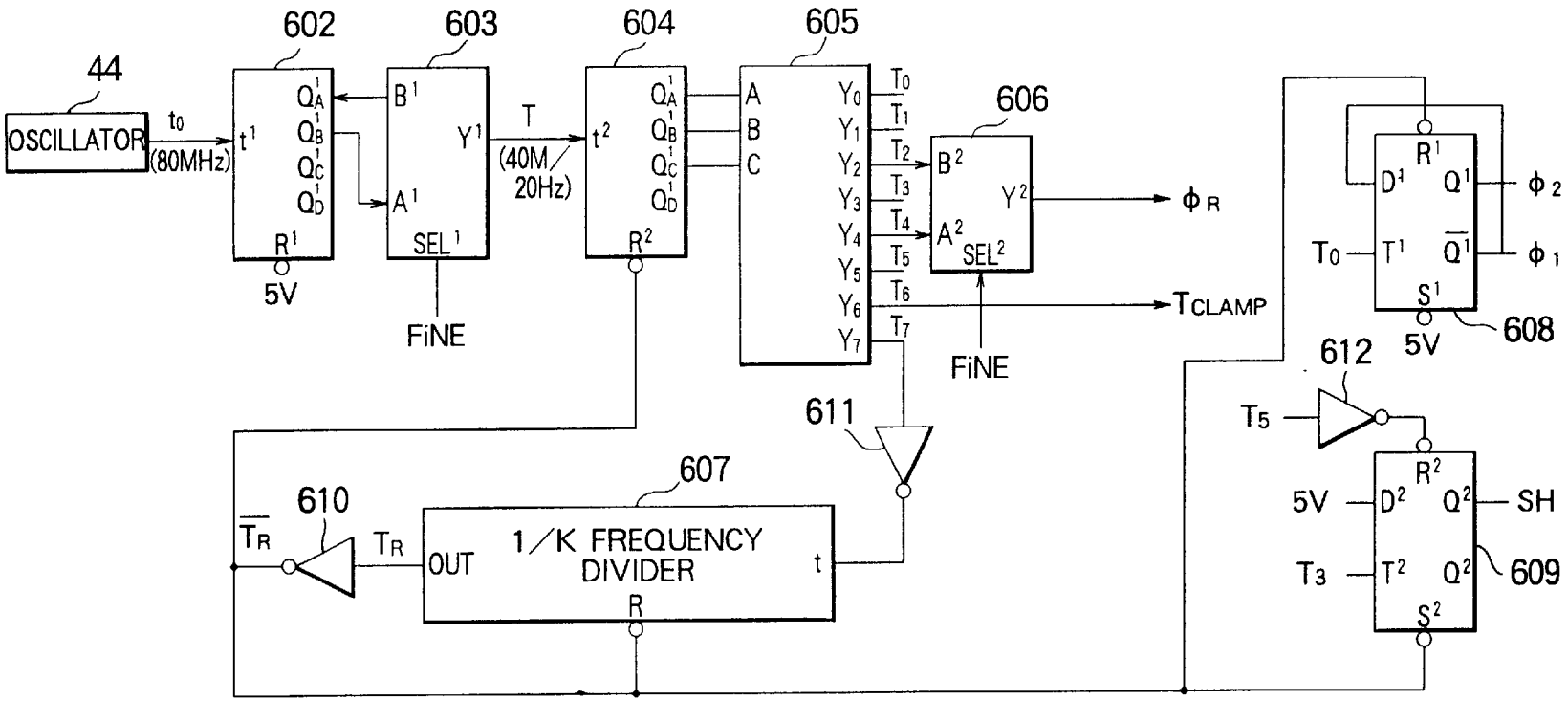
FIG. 6 is a circuit diagram showing a clock generating circuit in the embodiment of FIG. 1.

As shown in FIG. 6, the clock generating circuit 45 located in the control circuit 52 is provided with a 4-bit binary counter 602 for dividing an 80-MHz reference clock sent from the oscillator 44 in frequency, to which the 4-bit binary counter a data selector 603 is connected. When a FINE signal is "1" the output of the data selector 603 is $Y=T=Q'_B$ and its frequency is 20 MHz. When a FINE signal is "0", the output of the data selector 603 is $Y'=T=Q'_A$ and is frequency is 40 MHz. And, the 4-bit binary counter 604 for dividing an output T from the data selector 603 in frequency is connected to the data selector 603, and a decoder 605 is connected to the binary counter 604. Furthermore, a data selector 606 is connected to the decoder 605. The output of the data selector 606 is $Y_2=\phi_R=T_4$ when a FINE signal is "1", and the output of the data selector 606 is $Y^2=\phi_R=T_2$ when a FINE signal is "0".

Also, an invertor 611 for inverting its output $T_7$ is connected to the output terminal $Y_7$ of the decoder 605, and a frequency divider 607 for dividing its output into L/K in frequency is connected to the invertor 611. When the frequency divider 607 has counted the rising of outputs from the inventor 611 4096 times. $T_R$ begin is to rise with that rising and keeps 5 V until $T_R$ itself is reset to its inverted value. That is, this frequency divider 607 is a type of 1/4096 frequency divider. Incidentally, the number of elements N in the CCD sensor 40 is 4095 or less.

A D flip-flop 608 capable of setting and resetting is connected to the output terminal $Y_0$ of the decoder 605, and the D flip-flop 608 is arranged to output control pulses $\phi_1$ and $\phi_2$. A D flip-flop 609 capable of setting and resetting is connected to the output terminal $Y_3$ of the decoder 605, and the D flip-flop 609 is arranged to output a start pulse SH. The D flip-flop 609 is also arranged to be reset by an output of the invertor 612 for inverting the output terminal $Y_5$ or the decoder 605.

Then, the operation of the present embodiment shown in FIG. 1 will be described along the timing charts of FIGS. 7A to 8B. In the present embodiment, there are two operational modes and the operation in the high-resolution mode will be first described.

In the high-resolution mode, the FINE signal becomes "1". A basic clock $t_0$ is oscillated by the oscillator 44 and divided in frequency by the 4-bit binary counter 602, whose output is sent to the data selector 603. As shown in FIG. 8A, the output $Y'=T=Q'_B$ is issued in a frequency of 20 MHz by the data selector 603. And, an output T from the data selector 603 is divided in frequency by the 4-bit binary counter 604, whose output is outputted to the decoder 605. Furthermore, an output from the binary counter 604 is decoded by the deconder 605 and outputs $T_0$–$T_7$ are outputted. Then, an output $T_0$ from the decoder 605 is inputted to the T input of the D flip-flop 608, from which transfer pulse $\phi_1$ and $\phi_2$ are outputted as shown in FIGS. 7A and 8A.

Also, outputs $T_2$ and $T_4$ from the binary counter 604 are issued to the data selector 606. When a FINE signal is "1". $Y^2=\phi_R=T_4$ holds and a reset pulse $\phi_R$ is outputted from the data selector 606. On the other hand, an output $T_0$ from the decoder 605 is inputted to the T input of the D flip-flop 609 and an output $T_5$ from the decoder 605 is inverted by the invertor 612 and inputted to the D input of the D flip-flop 609 and a clock SH is outputted from the Q output of the D flip-flop 609 as shown in FIG. 8A, while an output $T_6$ of the decoder 604 is outputted as $T_{CLAMP}$ as shown in FIGS. 7A and 8A. Furthermore, an output $T_7$ from the decoder 605 is inverted by the invertor 611 and sent to the frequency divider 607. When the rising of outputs from the invertor 611 is counted 4096 times by the frequency divider 607. $T_R$ begins to rise and keep 5 V and $T_R$ itself is reset to the inverted value.

Figure 7A:
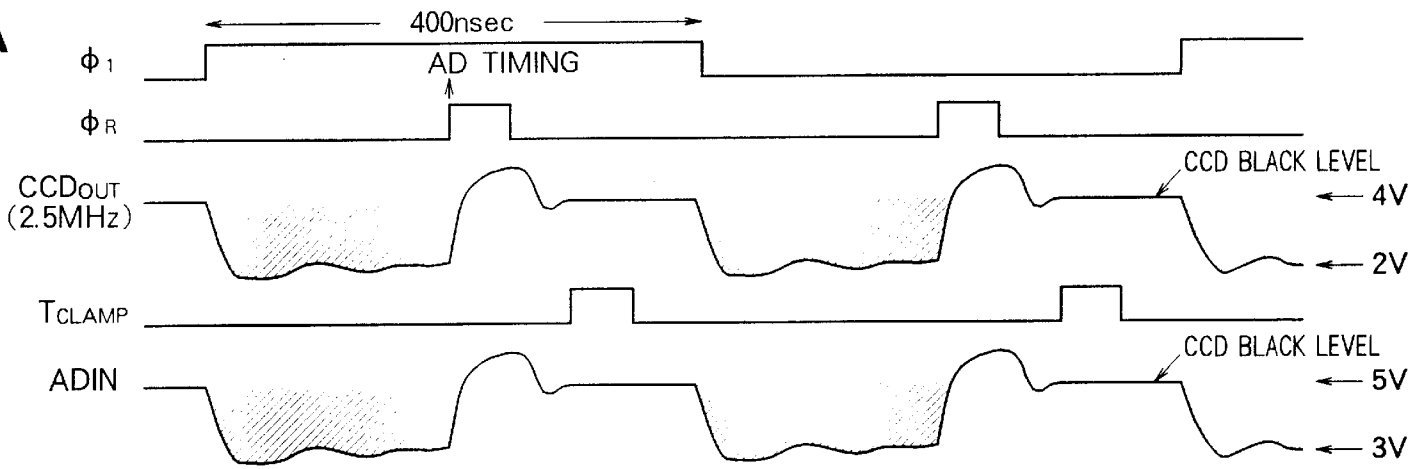
FIG. 7A is a first timing chart showing the operation of the embodiment of FIG. 1 in the high-resolution mode.
Figure 8A:
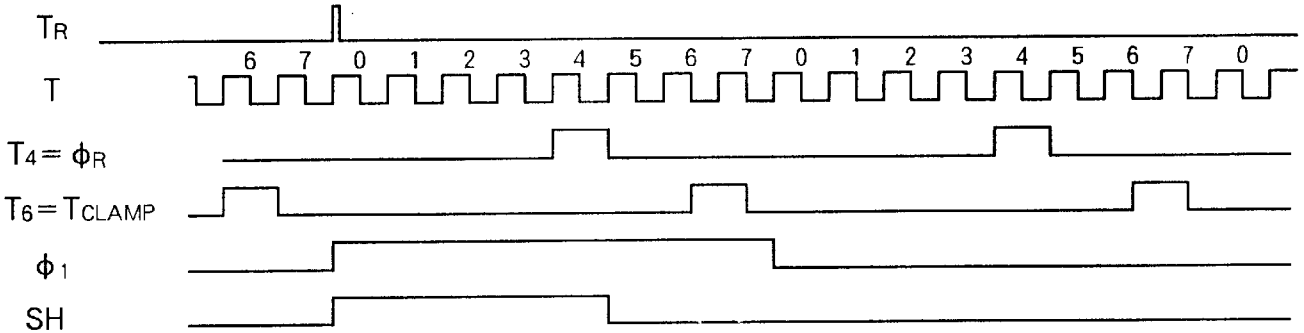
FIG. 8A is a second timing chart showing the operation of the embodiment of FIG. 1 in the high-resolution mode.
Figure 8B:
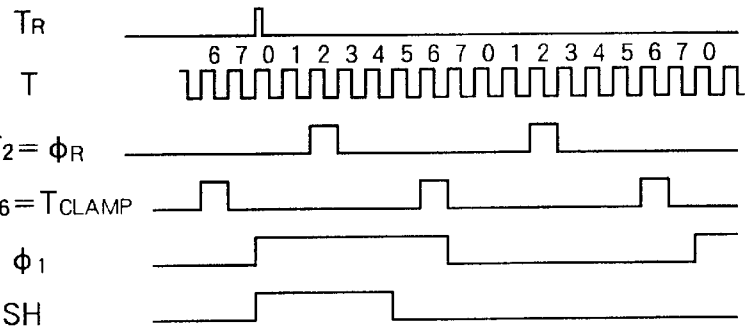
FIG. 8B is a second timing chart showing the operation of the embodiment of FIG. 1 in the high-speed mode.

As shown in FIG. 7A, an output $CCD_{out}$ from the CCD sensor 40 is clamped to 5 V by the capacitor C and analog switch. The clamped signal is amplified by the buffer 41 and outputted as an ADIN signal as shown in FIG. 7A. The ADIN signal is converted into digital signal by the AD convertors 51 and 42. Furthermore, digital signals $D_0$, $D_1$, . . . $D_{11}$ outputted from the first AD convertor 51 are inputted to the 12-bit input A of the data selector 53, while digital signals $D_0$, $D_1$, . . . $D_7$ outputted from the second AD convertor 42 are inputted to the 12-bit input B of the data selector 53. Then, in accordance with the FINE signal "1", the input A is selected by the data selector 53 and outputted to the control circuit 52.

Next, the operation in the high-speed mode will be described.

If the clock period is simply halved in FIG. 7A. $\phi_R$ and $CCD_{out}$ changed as indicated with dashed lines in FIG. 7B, so that the CCD black level in $CCD_{out}$ cannot be stabilized. Thus by forwarding the position of $\phi_R$ as indicated with a solid line, the stabilized period is secured.

Figure 7B:
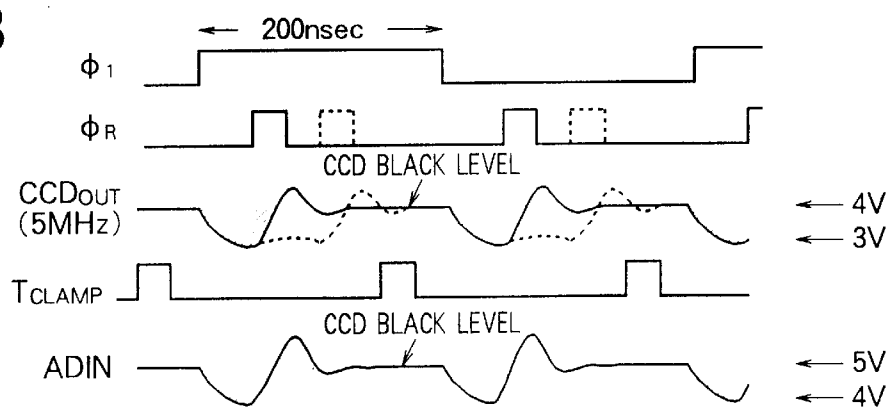
FIG. 7B is a first timing chart showing the operation of the embodiment of FIG. 1 in the high-speed mode.

In the high-speed mode, the FINE signal becomes "0". As shown in FIG. 7B, the output $CCD_{out}$ from the CCD sensor

40 is clamped to 5 V by the capacitor C and the analog switch. The clamped signal is amplified by the buffer 41 and outputted as an ADIN signal as shown in FIG. 7B. The ADIN signal is converted into digital signal by the AD convertors 51 and 42. Furthermore, digital signals $D_0$, $D_1$, . . . $D_{11}$ outputted from the first AD convertor 51 are inputted to the 12-bit input A of the data selector 53, while digital signals $D_0$, $D_1$, . . . $D_7$ outputted from the second AD convertor 42 are inputted to the 12-bit input B of the data selector 53. Then, in accordance with the FINE signal "0", the input B is selected by the data selector 53 and outputted to the control circuit 52.

Incidentally, as clearly seen from the timing chart of FIG. 7B, the timing for AD conversion is the time when the ADIN signal has just been settled in the high-resolution mode of FIG. 7A. At that time, the ADIN signal has still been unstable in the high-speed mode of FIG. 7B, but can be converted without error because of a lower accuracy of the 8-bit input in comparison with the 12-bit input in the high-resolution mode. It is important for a reader to accurately derive the black level, because this black level is a standard level for all operations.

Figure 9:
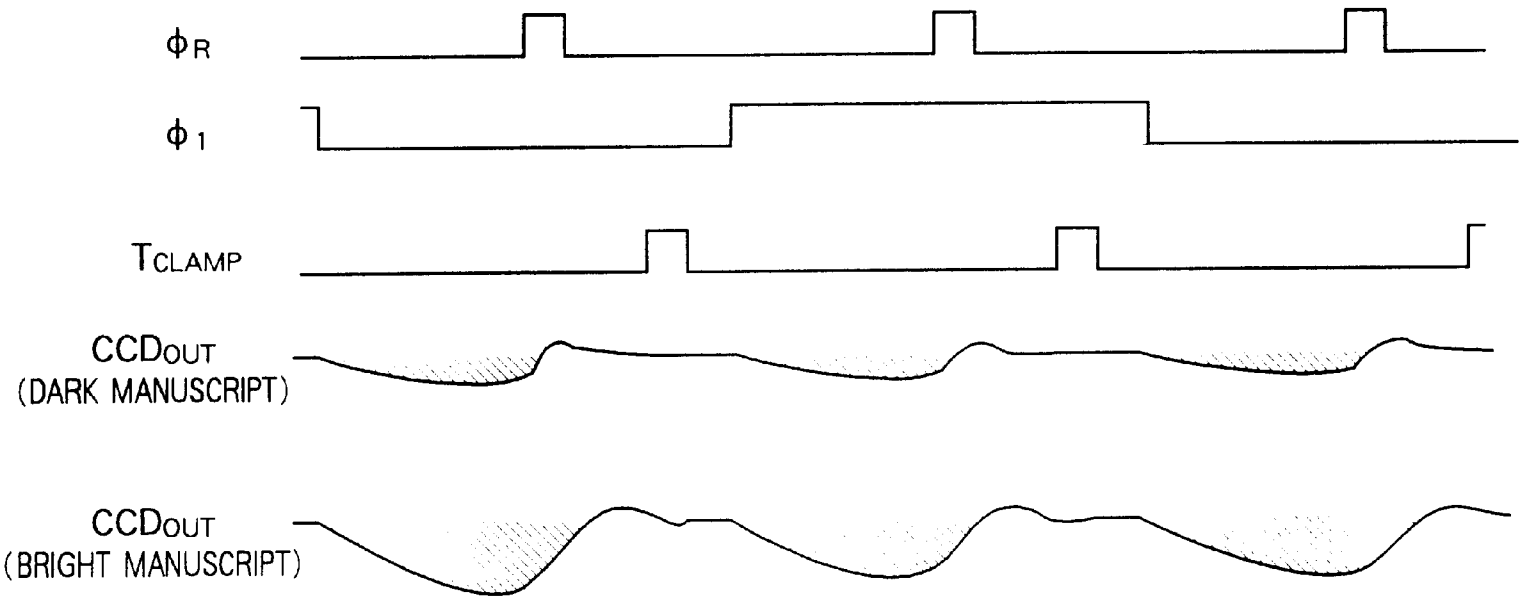
FIG. 9 is a timing chart showing the operation of the embodiment of FIG. 1 in different brightness cases of a manuscript.

As shown in FIG. 9, if both the CCD output $CCD_{out}$ and the manuscript are dark, the CCD black level rapidly reaches to a stable level even after $\phi_R$ is added to it, but it takes much time to achieve stability if the manuscript is bright. This is because the response speed of the output buffer inside the CCD is not fast in comparison with an ideal speed. Consequently, in order to add $T_{CLAMP}$ to the manuscript from a dark region to a bright region at a stable timing of the black level, the reset pulse $\phi_R$ indicated with a solid line in FIG. 7B should be used.

Many widely different embodiments of the present invention may be constructed without departing from the spirit and scope of the present invention. It should be understood that the present invention is not limited to the specific embodiment described in the specification, except as defined in the appended claims.

What is claimed is:

1. A reader having a high-resolution mode and a high speed mode, comprising:

a CCD sensor for converting a received light into an electrical analog signal;

a first AD convertor for converting the output along signal of said CCD sensor into a digital signal;

a second AD convertor for converting said output analog signal, the bit number of the output digital signal from said second AD convertor being less than that from said first digital signal;

selecting means for selecting one of the output digital signals of said first and said second AD convertors, the output digital signal from said first AD convertor corresponding to said high-resolution mode and the output digital signal from said second AD convertor corresponding to said high-speed period corresponds to said high-speed mode; *and*

*control means for controlling a reading period of said CCD sensor, wherein a first reading period corresponds to said high-resolution mode and a second reading period corresponds to said high-speed mode.*

2. The reader according to claim 1, wherein said first AD convertor performs an analog to digital conversion for a longer period than that of said second AD convertor.

3. The reader according to claim 1, wherein each of said first and said second AD convertors is arranged to convert an output of the CCD sensor within a predetermined course of time during the respective reading period, and the ratio of said predetermined course of time to the reading period in said second AD convertor is shorter than that of said predetermined course of time to the reading period in said first AD convertor so as to secure a period for stabilizing the output signal level of the CCD sensor.

4. The reader according to claim 1, further comprises a buffer and an analog switch for clamping the output of said CCD sensor to a predetermined DC voltage supplied from a power source in accordance with a control signal from said control means.

5. The reader according to claim 1, wherein said control means includes an oscillator for generating a base clock signal and a clock generating circuit for generating a plurality of clock signals by dividing the base clock signal in frequency.

6. The reader according to claim 1, wherein said first AD convertor converts an analog signal into a digital signal of 12 bits, and said second AD convertor converts an analog signal into a digital signal of 8 bits.

*7. A reader having a high-resolution mode and a high speed mode, comprising:*

*a CCD sensor for converting a received light into an electrical analog signal;*

*a first AD convertor for converting the output analog signal of said CCD sensor into a digital signal;*

*a second AD convertor for converting said output analog signal, the bit number of the output digital signal from said second AD convertor being less than that from said first digital signal;*

*a selector for selecting one of the output digital signals of said first and second AD convertors, the output digital signal from said first AD convertor corresponding to said high-resolution mode and the output digital signal from said second AD convertor corresponding to said high-speed period corresponds to said high-speed mode; and*

*a control circuit for controlling a reading period of said CCD sensor, wherein a first reading period corresponds to said high-resolution mode and a second reading period corresponds to said high-speed mode.*

* * * * *